May 27, 1930.  G. W. ELSEY  1,759,939
SHOCK ABSORBER
Filed June 22, 1927
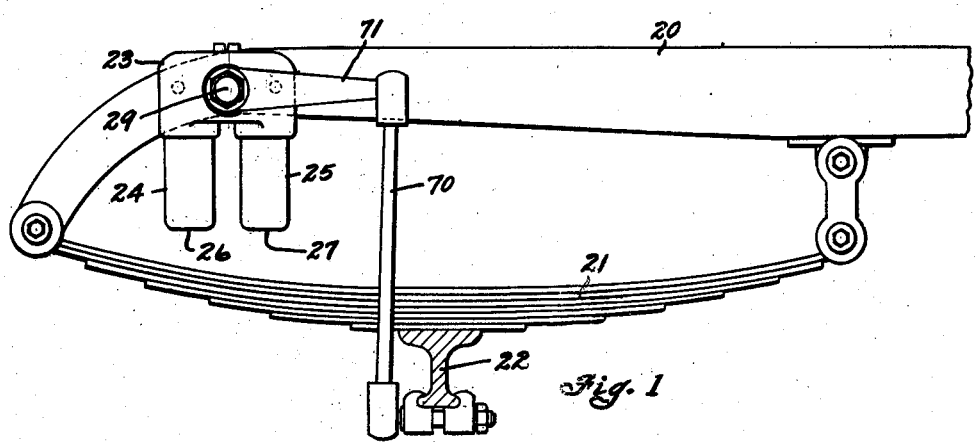
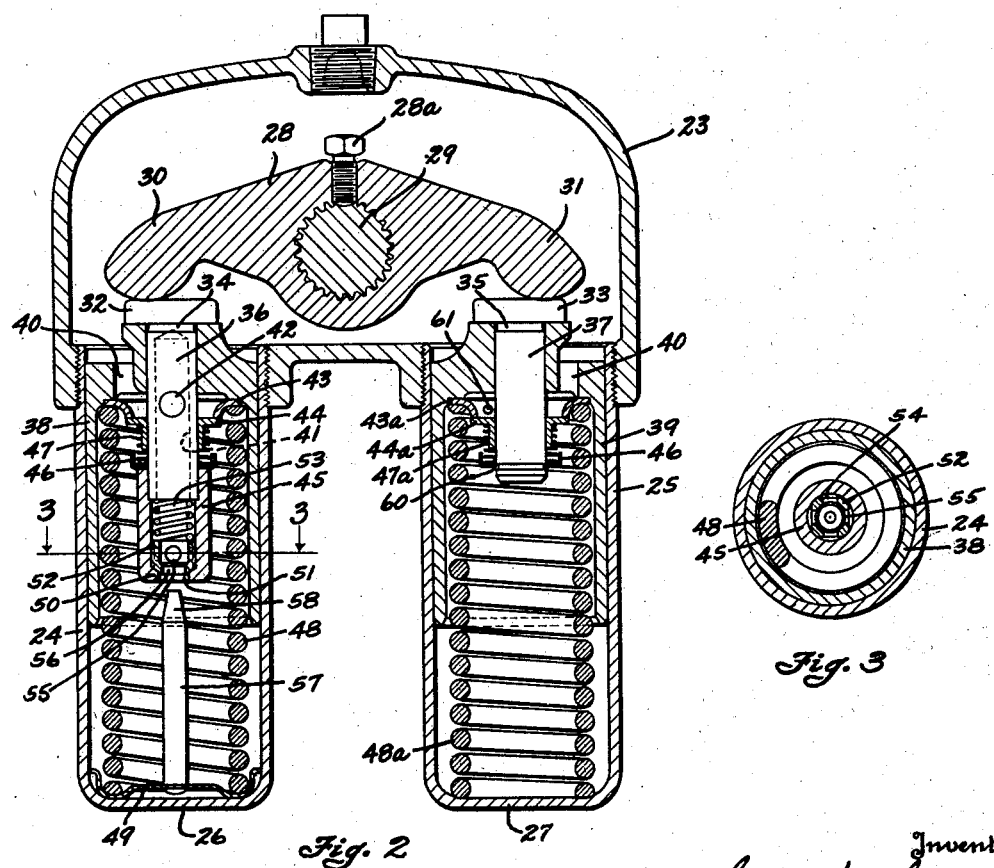
Inventor
George W. Elsey
By Spencer, Hardman &a Jenks
his Attorneys Patented May 27, 1930

1,759,939

UNITED STATES PATENT OFFICE

GEORGE W. ELSEY, OF DAYTON, OHIO, ASSIGNOR, BY MESNE ASSIGNMENTS, TO DELCO PRODUCTS CORPORATION, OF DAYTON, OHIO, A CORPORATION OF DELAWARE

SHOCK ABSORBER

Application filed June 22, 1927. Serial No. 200,689.

This invention relates to improvements in shock absorbers, particularly adapted for use on automotive or other vehicles which have a frame or body supported by springs upon the road wheel axles.

It is among the objects of the present invention to provide a smooth operating rebound shock absorber of simple structure and design, which will permit the springs of the vehicle to function as cushioning elements when the road bed upon which the vehicle is operated is comparatively smooth, said shock absorber, however, controlling the action of the vehicle springs when it is being operated over a substantially rougher road bed.

Further objects and advantages of the present invention will be apparent from the following description, reference being had to the accompanying drawings, wherein a preferred form of embodiment of the present invention is clearly shown.

In the drawings:

Fig. 1 is a diagrammatic fragmentary side view showing the vehicle frame and axle and a form of the present invention applied thereto.

Fig. 2 is a longitudinal sectional view of the rebound check.

Fig. 3 is a transverse section taken along the line 3—3 of Fig. 2.

Referring to the drawings, and more particularly to Fig. 1, thereof, the numeral 20 designates the frame member of the vehicle which is supported by springs, one of which is shown at 21, mounted upon an axle 22 to which the road wheels, not shown, are secured. The shock absorber includes a bracketed casing 23 providing a fluid reservoir to which is attached the ends of cylinders 24 and 25 so as to communicate with said reservoir, the other ends of the cylinders being closed as at 26 and 27 respectively. The bracketed casing 23 is attached in any suitable manner either to the axle 22 or the frame 20, however, in the present drawings, the casing is illustrated as being secured to the frame. Within the casing 23 there is housed an oscillatable yoke 28 having a central aperture which is adapted to fit over a shaft 29 extending through the housing. The shaft 29 and the inside of the aperture of the yoke 28 are both serrated as shown in Fig. 2 so as to insure a rigid connection between the said yoke and shaft. A set screw 28$^a$ assists in securing the yoke to the shaft. The yoke comprises two oppositely disposed arm portions 30 and 31 which are adapted to engage with caps 32 and 33 of wear pieces 34 and 35 respectively. These wear pieces have shank portions 36 and 37 respectively which fit into central apertures in the pistons 38 and 39 respectively. The piston 38 is reciprocally mounted in the cylinder 24 while the piston 39 is reciprocally mounted in the cylinder 25, each piston being provided with a head portion engaged by the cap portions of their respective wear pieces. In the head portion of both pistons there is provided a fluid passage 40 which provides communication between the interior of the casing 23 and the interior of the cylinders 24 and 25.

The shank portion 36 of the wear piece carried by piston 38 is provided with a longitudinal passage 41 communicating with the fluid passage 40 by means of a transverse passage 42. A counterbored portion in the inside surface of the piston head receives a valve seat member 43 which is adapted to be engaged by a valve 44 slidably supported upon the shank portion 36 of the wear piece. A sleeve 45 is securely mounted upon the end of the shank 36 so that the inner edge of said sleeve is spaced from the piston head. A spring retainer cup 46 rests upon this edge of the sleeve 45, spring 47 being interposed between said retainer cup and the valve 44 normally holding said valve in engagement with the valve seat member 43. A spring 48 has its one end resting upon a holder 49 engaging the bottom 26 of the cylinder 24, the other end of said spring engaging the valve seat member 43 to hold it in position in the counterbored portion in the interior surface of the piston head. Spring 48 normally exerts a pressure upon the piston to hold the cap 32 of the wear piece of said piston in engagement with the arm 30 of the yoke 28.

The end of the sleeve 45 has an inwardly extending annular flange 50 providing an orifice 51. Said flange also provides a valve seat for the sleeve valve 52 which is slidably supported within the sleeve 45 and maintained against the seat formed by the flange 50 by spring 53 interposed between said sleeve valve and the end of the shank 36. In Fig. 3, it may be seen that the outside wall of the sleeve valve 52 is provided with flattened portions 54 providing passages between it and the sleeve 45. The transverse passages 55 in the valve 52 form communication between the interior of said valve and the passages formed by the flat portions 54. The sleeve valve 52 is also provided with an inwardly extending flange forming an orifice 56 adjacent the orifice 51 of the sleeve 45, said orifice 56, however, being of lesser diameter than the orifice 51.

The holder 49 carries the metering pin 57 so that it will be coaxial with the sleeve 45. The main body portion of the metering pin is of a diameter less than the diameter of the orifice 51 but slightly greater than the orifice 56. The free end of the metering pin is tapered as at 58, said end normally being spaced from the orifice end of the sleeve 45.

The piston 39 is provided with a valve similar to the valve on the piston 38 comprising the valve seat member 43ª, the valve 44ª, the spring 47ª and its retainer cup 46, so no description of this valve will be given. However, in this valve structure the valve spring retainer cup is maintained upon the shank portion 37 of wear piece of this piston by a spring washer 60 which fits into an annular groove formed adjacent the end of the shank 37. The valve seat member 43ª in this valve structure is provided with a constant flow orifice 61 which provides constant communication between the interior of the cylinder 25 and the fluid passage 40 of the piston. A spring 48ª is interposed between the bottom 27 of cylinder 25 and the head portion of the piston, said spring exerting a force to hold the cap portion 33 of the wear piece of this piston in normal engagement with the arm 31 of the yoke member 28.

The device is so constructed that it will offer substantially little resistance to slight movements of the spring 21, caused by the road wheels striking small obstructions, however, when a bump of considerable size is engaged by the wheels of the vehicle, the spring 21 will be flexed toward the frame 20, this approach causing the lever 70, one end of which is anchored to the axle 22, the other to the oscillating lever 71 secured to shaft 29, so that said levers 70 and 71 are moved to rotate shaft 29 in a counterclockwise direction, as regards Figs. 1 and 2, thus causing the arm 30 of the yoke 28 to force the piston 38 into the cylinder 24 while at the same time spring 48ª will cause the piston 39 to follow the counterclockwise movement of the arm 31 of said yoke. In the case of the piston 39, fluid in the casing 23 will move the valve 44ª from its seat member 43ª against the effect of the spring associated therewith, thus providing a passage for a substantial free flow of fluid from the casing 23 through the passage 40 past the valve structure into the cylinder 25.

Fluid within the cylinder 24 will be compressed and during a predetermined range of initial movement of the piston 38 toward the bottom 26 of its cylinder, or more specifically, before the tapered portion 58 of the metering pin enters the orifice 51, the fluid flow through the orifices 51 and 56 and passages 41, 42 and 40 to the casing, will be restricted to a comparatively small degree. When the piston has been moved by the arm 30 a sufficient distance so that the tapered portion 58 of the metering pin will enter the orifice 51, the tapered portion will gradually restrict the fluid passage, thus the movement of the piston will be gradually resisted. This gradual increase in restriction will obtain until the end of the metering pin enters into the orifice 56 of the sleeve valve 52 and actually engages the same at which time the flow of fluid will be substantially cut off and the highest resistance offered to the movement of the piston. Continued movement of the piston, however, after such engagement of pin 57 and valve 52 will cause the pin 57 to move the valve 52 from its seat on the sleeve 45 against the effect of the spring 53, thus establishing a restricted flow of fluid through the space between the pin 57 and the flange 50 and through the passages provided by the flat portions 54 of the sleeve valve 52.

From this it may be seen that in its movement toward the bottom of the cylinder 24, piston 38 will first move substantially freely, then said movement will gradually be resisted, such resistance increasing until the piston has reached a predetermined point at which time resistance will be somewhat decreased and then maintained constant, at such a decrease, through the continued movement of the piston toward the bottom. Upon its return piston 38 will have its valve 44 lifted from its seat 43 by the fluid in the casing 23, thus establishing a flow of fluid from said casing to the cylinder 24 at substantially no restriction. The return of the piston 38 to its normal position is due to the separation of the movable members namely: the vehicle frame 20 and the spring 21. This spring causes the levers 70 and 71 to rotate the shaft 29 in a clockwise direction, consequently arm 30 will move away from the piston cap 32 while arm 31 will force the piston 39 further into its cylinder. The movement of the piston 39 into its cylinder will compress the fluid therein, the only escape of said fluid being through the constant flow aperture 61. From this it may be seen that the movement of separation by the movable members 20 and 21 is constantly restricted.

The present device provides a shock absorber which will resist movement of the vehicle springs directly in accordance with the severity of the impact or shock against the vehicle spring. As the impact upon the road wheels and axle is slight, a slight movement of the piston 38 obtains, such slight movement however being slightly resisted. As the impacts against the wheels increase the resistance to the movement of the piston 38 increases, thus substantially eliminating the transfer of the impacts to the body of the vehicle. The piston 39 offering a constant resistance to the separation of the movable members 20 and 21 reducing or checking the rebound and thus substantially eliminating the ill effect of such rebounds upon the vehicle body.

It may readily be understod that in order to vary the operation of the fluid flow control in the piston 38, the metering pin 57 may be changed so that the resistance to the operation of the piston 38 may be increased or decreased by the provision of a larger or smaller metering pin respectively.

While the form of embodiment of the present invention as herein disclosed, constitutes a preferred form, it is to be understood that other forms might be adopted, all coming within the scope of the claims which follow.

What is claimed is as follows:

1. A shock absorber for cushioning the movement of two relatively movable members comprising, a casing having two cylinders providing a fluid reservoir adapted to be secured to one of said members; a separate piston reciprocable in each cylinder; operating means secured to the other movable member for moving both pistons, an intake valve in each piston; fluid flow controlling means comprising a part of the intake valve carried by one of said pistons cooperating with a member supported in its cylinder for gradually and increasingly restricting the flow of fluid through said piston to resist the movement of said piston by the operating means when the movable members approach each other; and a constant fluid flow orifice provided by the intake valve in the other piston for constantly restricting the flow of fluid through this piston constantly to resist the movement of said piston by the operating means when the movable members separate.

2. A shock absorber for cushioning the movemnt of two relatively movable members comprising, a casing having two cylinders providing a fluid reservoir and adapted to be secured to one of said members; a separate piston reciprocable in each cylinder; operating means secured to the other movable member and engaging both pistons for moving each in one direction; means comprising mechanism carried by the one piston and a member supported in its cylinder for establishing an increasingly restricted flow of fluid through said piston while it is being moved through a certain range in this one direction by the aproach of one of said movable members toward the other, said means being adapted at a certain point of said movement of the piston to entirely cut off the flow of fluid through said piston, continued movement of said piston beyond said point re-establishing a restricted flow of fluid through said piston; and means for constantly resisting the movement of the other piston during its entire range of movement by the separation of the movable members.

3. A shock absorber for cushioning the movement of two relatively movable members comprising, a casing having two cylinders providing a fluid reservoir and adapted to be secured to one of said members; a separate piston reciprocable in each cylinder; operating means secured to the other movable member and engaging both pistons for moving each in one direction; means carried by the one piston and its cylinder for increasingly resisting the movement of the piston after it has been moved through a certain range in this one direction by the approach of one of said movable members toward the other, said means, however, partially releasing the piston when it has been moved through a certain range of its travel by the approach of the movable members; and means provided by the other piston for constantly counteracting its movement by the separation of the movable members.

4. A shock absorber for cushioning the movement of two relatively movable members comprising, a casing having two closed-end cylinders providing a fluid reservoir and adapted to be secured to one of said members; a separate piston reciprocable in each cylinder; a pivotal yoke within said casing, engaging the pistons; an actuating arm secured to the yoke and one of the movable members, and adapted to operate the yoke to move one piston toward the end of its cylinder when the movable members approach each other and to move the other piston further into its cylinder upon separation of the movable members; a spring in each cylinder for moving the pistons away from the ends of their respective cylinders when the yoke is rotated away from the particular piston; valved passages in both pistons providing for the transfer of fluid from one side of the piston to the other, at a substantially unrestricted flow when said pistons are operated by the springs; a valved passage in the one piston gradually and increasingly restricting the transfer of fluid from one side of the piston to the other when said piston is operated by the yoke; and a constant flow orifice in the other piston for constantly restricting the transfer of fluid past this piston when it is operated by the yoke.

5. A shock absorber comprising in combination, a casing providing a fluid reservoir; a pair of cylinders secured to and communicating with the casing; pistons mounted for reciprocable movement in said cylinders; means for moving each piston in either direction in its respective cylinder; intake valves carried by the pistons providing for a substantially free flow of fluid through said pistons when they are moved in the one direction; fluid flow controlling means in the one piston, comprising a spring loaded member carried by a part of the intake valve of said piston and a cooperating metering pin supported within the cylinder providing for a variably restricted flow of fluid through it when it is moved in the other direction; and means provided in the intake valve of the other piston providing for a constantly restricted flow of fluid through it when said piston is moved in the other direction.

6. A shock absorber comprising in combination, a casing providing a fluid reservoir; a pair of cylinders secured to and communicating with the casing; pistons mounted for reciprocable movement in said cylinders; means for moving each piston in either direction in its respective cylinder; a check valve carried by each piston, which, when the piston is moved in the one direction, will provide for the substantially free flow of fluid therethrough; a fluid flow control device in the one cylinder, comprising a spring loaded valve carried by the piston and a tapered metering pin carried in the cylinder and adapted to enter said valve, said fluid flow control device providing a passage of comparatively low restriction during the initial movement of the piston in this other direction, however, gradually increasing the restriction to the flow of fluid as the piston continues to move in this other direction until said passage is entirely closed by the engagement of the spring loaded valve by the metering pin, which pin, upon continued movement of the piston, will lift the spring loaded valve and provide a restricted bypass for the flow of fluid around said valve; and a constant flow orifice in the other piston, providing a restricted passage for the flow of fluid through said piston when it is moved in the other direction.

7. A shock absorber for cushioning the movement of two relatively movable members comprising a casing providing a fluid reservoir adapted to be secured to one of said members, said casing having two cylinders attached thereto and communicating therewith; a separate piston reciprocable in each cylinder; means secured to the other of said members for operating said pistons in one direction; means adapted increasingly to resist movement of one piston by the approach of one movable member toward the other, said means comprising a tubular member carried by the piston and presenting a fluid flow orifice, and a metering pin supporting within the cylinder coaxially of the tubular member and adapted to enter the orifice gradually to decrease its fluid flow capacity, and a constant flow orifice in the other piston providing an egress for the fluid compressed beneath said piston, whereby the movement of said piston by the separation of the aforementioned movable members is resisted at substantially unvarying degree.

8. A shock absorber for cushioning the movement of two relatively movable members comprising a casing providing a fluid reservoir adapted to be secured to one of said members, said casing having two cylinders attached thereto and communicating therewith; a separate piston reciprocable in each cylinder; means secured to the other of said members for operating said pistons in one direction; means adapted increasingly to resist movement of the one piston by the approach of one movable member toward the other, said means comprising a tubular member carried by the piston, said tubular member having an inwardly extending annular flange upon which a spring loaded valve normally rests, said valve having an orifice, and a metering pin supported in the cylinder, provided with a tapered end adapted to enter the orifice of the spring loaded valve to gradually reduce its fluid flow capacity, and a constant flow orifice in the other piston providing an egress for the fluid compressed beneath said piston, whereby the movement thereof by the separation of the movable member is resisted substantially constantly.

9. A shock absorber comprising in combination, a casing presenting a fluid chamber and two cylinders, a piston in each cylinder, means in the casing for operating said pistons, a check valve in each piston one check valve comprising a tubular valve stem, the other a solid valve stem. said check valves establishing a free flow of fluid from the fluid chamber through their respective pistons into the respective cylinders in response to the movements of the respective pistons in the one direction, means in the one direction including the tubular valve stem of its check valve and a cooperating metering pin in its cylinder for establishing an increasingly restricted flow of fluid from said cylinder, through said piston and into the fluid chamber in response to the movement of this piston in the other direction, and means provided by the check valve of the other piston for establishing a constantly restricted flow of fluid from the other cylinder, through its piston and into the fluid chamber in response to the movement of the other piston in the other direction.

10. A shock absorber comprising in combination, a casing presenting a fluid chamber and two cylinders, a piston in each cylinder, each piston having a fluid passage in its head portion, means for operating said pistons, a cylindrical member centrally attached to each piston head and extending into its respective piston, a valve seat member in each piston, a spring pressed valve slidably supported on each cylindrical member and normally engaging its respective valve seat member, a central passage in the one cylindrical member, communicating with the passage in its piston head, a sleeve-like extension on said cylindrical member, an orificed, spring-loaded valve in said extension, a metering pin in the cylinder coaxially aligned of the orifice in said spring-loaded valve, and a constant flow orifice in the valve seat member of the other piston.

11. A shock absorber comprising, in combination, a casing having a fluid reservoir and two cylinders; a piston in each cylinder; means for reciprocating said pistons; an intake valve in each piston adapted to establish a substantially free flow of fluid from the reservoir through the respective pistons into the respective cylinders in response to the movement of said respective pistons to increase the cubical contents of their respective cylinders; means in the one piston for establishing an increasingly restricted flow of fluid through said pistons in response to its movement to decrease the cubical contents of its cylinder, said means comprising a part of the intake valve of said piston; and means provided by the intake valve of the other piston for establishing a constantly restricted flow of fluid through said other piston in response to its movement to reduce the cubical contents of its cylinder.

In testimony whereof I hereto affix my signature.

GEORGE W. ELSEY.